United States Patent [19]

Munier et al.

[11] Patent Number: 5,471,581
[45] Date of Patent: Nov. 28, 1995

[54] ELASTIC CONFIGURABLE BUFFER FOR BUFFERING ASYNCHRONOUS DATA

[75] Inventors: Jean-Marie Munier, Cagnes sur Mer; Andre Pauporte, La Colle sur Loup; Clement Poiraud, Cagnes sur Mer, all of France

[73] Assignee: International Business Machines Corporation, Armonk, N.Y.

[21] Appl. No.: 146,770

[22] Filed: Jun. 23, 1993

Related U.S. Application Data

[63] Continuation of Ser. No. 612,773, Nov. 13, 1990, abandoned.

[30] Foreign Application Priority Data

Dec. 22, 1989 [EP] European Pat. Off. ............. 89480187

[51] Int. Cl.⁶ .................................................. G06F 12/00
[52] U.S. Cl. ....................... 395/250; 395/474; 364/239; 364/239.6; 364/244.8; 364/252; 364/DIG. 1
[58] Field of Search .................................. 395/425, 250, 395/325, 275; 365/230.05, 189.01

[56] References Cited

U.S. PATENT DOCUMENTS

| | | | |
|---|---|---|---|
| 4,175,287 | 11/1979 | Fuhrman . | |
| 4,541,076 | 9/1985 | Bowers et al. | 365/230.05 |
| 4,616,310 | 10/1986 | Dill et al. | 395/250 |
| 4,779,234 | 10/1988 | Kaneko et al. | 365/221 |
| 5,056,010 | 10/1991 | Huang | 395/425 |
| 5,072,420 | 12/1991 | Conley et al. | 395/425 |
| 5,083,269 | 1/1992 | Syobatake et al. | 395/425 |
| 5,261,059 | 11/1993 | Hedberg et al. | 395/325 |
| 5,263,143 | 11/1993 | Robinson et al. | 395/425 |
| 5,293,611 | 3/1994 | Wada | 395/425 |
| 5,377,344 | 12/1994 | Stager et al. | 395/425 |
| 5,406,554 | 4/1995 | Parry | 370/58.1 |

FOREIGN PATENT DOCUMENTS 1243631 8/1971 United Kingdom ............ G11C 11/00

OTHER PUBLICATIONS

IBM TDB, vol. 28, No. 12, May 1986, pp. 5314–5316.
IBM TDB, vol. 30, No. 4, Sep. 1987, pp. 1432–1434.

*Primary Examiner*—Gopal C. Ray
*Attorney, Agent, or Firm*—Joscelyn G. Cockburn

[57] ABSTRACT

An elastic buffer is provided between two busses working with independent clocking. The buffer is implemented by a piece of RAM memory (37) partitioned into sectors (41), each of which contains successive memory addresses. Each sector (41), can be alternatively written and read, so that at a given moment, a sector in write mode and a sector in read mode may coexist. Each sector is controlled by a mark flag (MF), a set flag corresponding to a fully written sector, and a reset flag corresponding to a sector that has been read onto the destination bus. The mark flag of each sector is set, respectively reset, upon the event of a move in pointer, respectively move out pointer, reaching the next adjacent sector. For a given elastic buffer size, the size of the sectors (41) and the number of mark flags are adaptable to the specifications of the data flow between the origin and destination busses.

11 Claims, 9 Drawing Sheets

ELASTIC CONFIGURABLE BUFFER FOR BUFFERING ASYNCHRONOUS DATA

This patent is a continuation of Ser. No. 612,773, Nov. 13, 1990, abandoned.

FIELD OF THE INVENTION

The present invention relates to an elastic buffer to be used for example in asynchronous communication systems, where transmitters and receivers working asynchronously, need to be synchronized, at least over periods corresponding to the time necessary for transmission of a unit of data.

BACKGROUND ART

In a digital communications system it is frequently necessary to accept data from a remote source and synchronize it to a local or output clock. One example of this is an incoming time division multiplex (TDM) data stream the various data channels of which must be routed to separate destinations through a TDM switching center. A conventional way of handling this situation is to use a double rank register. The received data is shifted in serially by the received or input clock, a parallel transfer is made to the output register, and the data is sent out under the control of the local or output clock. This method is useful for transferring short bursts of data.

Where two asynchronous systems must be buffered for longer intervals, random access memories are used. The technique is to write the input data into the random access memory using the received clock to operate a sequential address counter. At some later time, the memory is read out by addressing it through a counter operated by the local or output clock. While the data is being read out, the new received data must be stored in a different memory chip because a memory cannot be written into and read from simultaneously. This method therefore requires a multiplicity of memory chips, and the arrangement overflows when both input and output address counters attempt to access the same memory chip.

This problem has been partially overcome by the use of an elastic buffer, as the one described in U.S. Pat. No. 4,056,851 which includes a single random access memory from which information bits are read out at a rate determined by an output clock, and into which received information bits are written at a rate determined by an input clock, where the two clocks are not exactly synchronous. Timing and storage means are provided to accommodate the zero, one or two information bits, which may be received for storage in the memory, in the interval between the readout of two successive information bits from the memory. An alarm is given if the input and output clock rates are such that the memory is emptied, or is filled and about to overflow.

The elastic buffer described in the above cited patent, even if it provides an interesting alternative to the conventional first-in-first-out (FIFO) buffers, does not solve several supplementary problems. In particular, the provision for a buffering RAM is not enough to avoid the necessity for substantial external data and clock buffering, using registers. Further, the elasticity between the two asynchronous data flows is limited to one or two bits, which excludes the possibility of asynchronous transmission and buffering of several bytes of data. Moreover, the reception of data by the elastic buffer, and the retransmission of data remain two successive and alternating operations of a FLIP-FLOP type, which, in view of the limited capacity of the elastic buffer, affects the throughput of the buffer, and consequently, of the data transmission between the asynchronous emitter and receiver.

OBJECTS OF THE INVENTION

Therefore, it is an object of the invention to provide an elastic buffer for buffering data between two asynchronously working elements, which no longer has the above mentioned drawbacks.

More specifically, it is an object of the invention to provide an elastic buffer capable of simultaneously receiving and transmitting asynchronous data units covering several bytes of information, the data being, of course, transmitted in the order of their arrival.

It is another object of the invention to provide for fully independent reception and transmission operations within the buffer.

It is a further object of the invention to provide an elastic buffer that is configurable and adaptable to various data unit sizes or data flow characteristics.

It is an even further object of the invention to provide an elastic buffer which allows the buffering of data between a transmission unit, and several receiving units, to each of which a part of the transmitted data are asynchronously buffered.

SUMMARY OF THE INVENTION

These objects and more are achieved by the elastic buffer of the present invention.

According to the invention, an elastic buffer is provided in the form of a RAM memory, divided into a plurality of sectors delimited by flags. For a given RAM size, the size of the sectors and the number of flags are adaptable to the size of the data units to be asynchronously received and transmitted. The sectors are dynamically set into a read or write mode, so that at a given moment, sectors in one of both modes exist, which ensures simultaneity of transmitting and receiving operations.

The mode of the sectors is set through the binary value affected to the delimiting flags, and the adequate chronology of the received/transmitted data units is ensured by the rotation of the flag values throughout the RAM memory space.

Further features and advantages of the invention will become apparent from the following detailed description of a preferred embodiment of the invention, in connection with the accompanying drawings.

BRIEF DESCRIPTION OF THE DRAWINGS

FIGS. 5A-1 and 5A-2 are the schematic representation of an implementation of the elastic buffer and the associated logic.

DETAILED DESCRIPTION OF THE INVENTION

Figure 1:
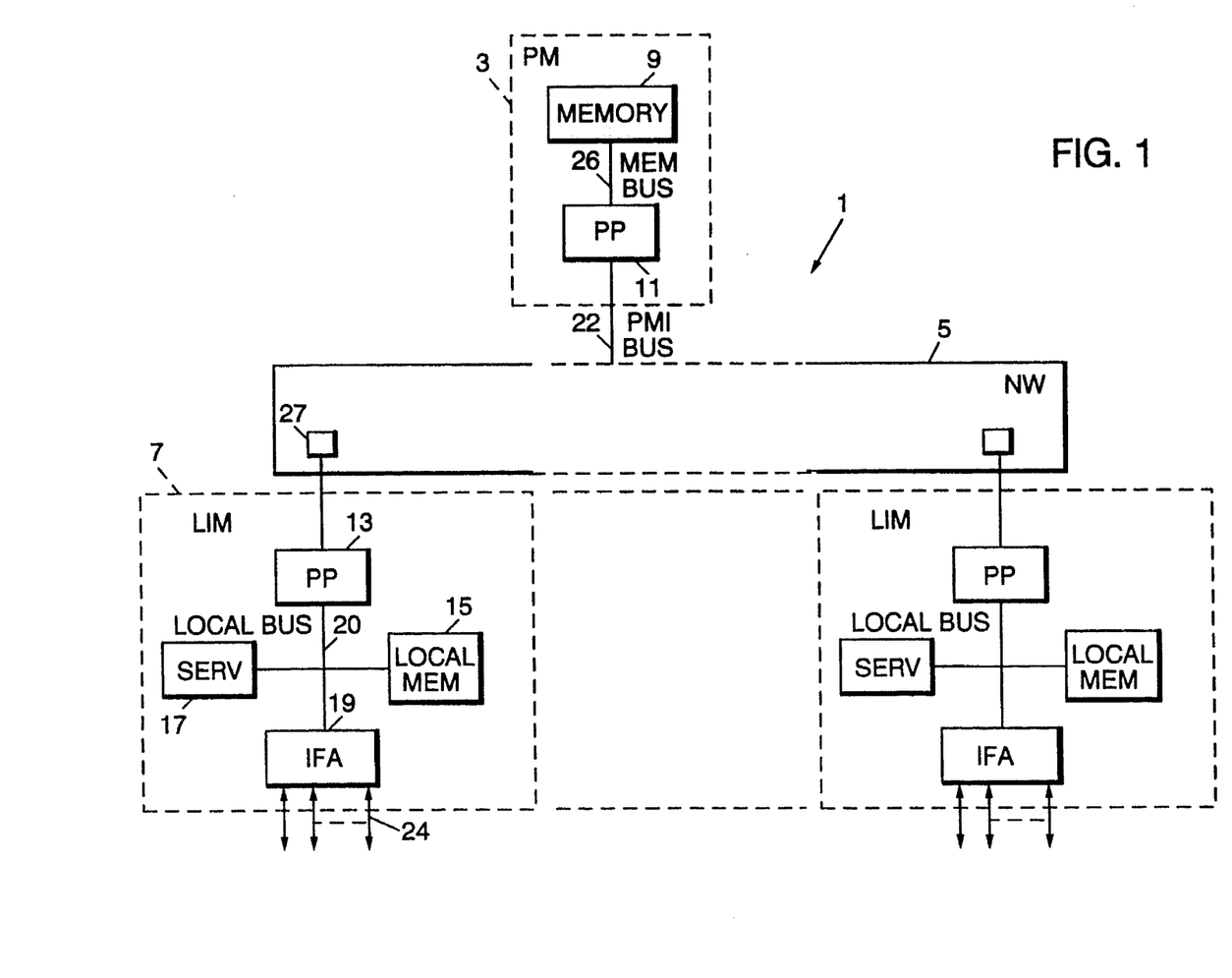
FIG. 1 is a schematic view of a data communication system wherein the elastic buffer of the invention may be used.

FIG. 1 shows the configuration of a system (1) in which the present invention finds an exemplative and not limitative application. The system (1) is a communication system in which multiple users (not shown) are connected, through lines (24), to a line interface module LIM (7), and further to a shared memory, or packet memory PM (3), through an interconnection network NW (5). Such an arrangement is used, for instance, in communications controllers, and is more fully described in a copending patent application No. 88480102.8 filed on Dec. 23th, 1988 by same applicant, entitled "Shared intelligent memory for the interconnection of distributed micro-processors".

The shared memory (3) includes one or several memory banks (9) which can be accessed to through a memory bus (26). A pico-processor (11) provides for adaptation between the data/command words on said memory bus (26) and a Packet Memory Interface bus (PMI bus) (22) connected to the interconnection network (5). The interconnection network is a multiple port packet switch which, in response to data packets entered at one of its ports, can route said data packets to the required output port, through the packet memory (3).

A brief explanation of the system shown in FIG. 1 should make understandable the interest for an elastic buffer according to the invention. When a user connected to the packet memory (3) through a line (24) and a line interface module LIM (7) wants to write information into the packet memory, it transmits a request to the server (17) through an interface adapter IFA (19). The server (17) posts a control word corresponding to said request, into the local memory (15) of the LIM (7). According to a first rate asynchronous with the user clock, a pico-processor (PP) (13) handles the control word stored within the local memory (15) and assembles a high level command called REQUEST, for the purpose of writing the data provided by the user at a given location of the packet memory (3). The format of such a high level command has been described in the above mentioned copending patent application, but is not critical for the understanding of the present invention.

On the packet memory (3) side, a pico-processor (11) connected to a Packet Memory Interface (PMI) bus (22) works at a given frequency, higher than the frequency of each LIM (7), and stores the high level commands provided by the LIMs in order to change them into physical write (or read) operations into (from) the memory (9). The write/read operations are performed according to a rate corresponding to the clocking of the memory bus (26).

Since the memory bus (26) has an operating frequency which is totally independent of the PMI bus (22) frequency and of the local bus (20) frequency, and since information between LIMs and packet memory (3) have to be exchanged on the fly, i.e. practically in real time, with very short delays corresponding to the time necessary for a given user to finish a current communication, it appears necessary to provide for elastic buffering means, between each couple of asynchronous busses (20, 22) and (22, 26).

Of course, elastic buffering means is not only necessary for write operations from users into the packet memory, but also for read operations, wherein users need to read data from the packet memory (3), through the LIMs (7).

Therefore, each pico-processor PP (13, 11) is provided with an elastic buffer according to the invention, said elastic buffer being capable of the buffering needed for simultaneous write and read operations between packet memory and users.

Of course, it will be understood that, although the communications system (1) shown in FIG. 1 provides a typical application for the elastic buffer according to the invention, the latter is in no way limited to this specific application, and may provide advantages each time elastic and bidirectional buffering is needed between two asynchronous data lines or busses.

Therefore, in order to enhance clarity of the specification, although the elastic buffer that will be described in greater detail would correspond to the one included in pico-processor (13) for exchanging information between the PMI bus (22) and the local bus (20) of a given LIM (7), the two asynchronous busses between which the elastic buffer according to the invention operates could more generally be called: a first bus (A), and a second bus (B), as in FIGS. 3 and 4.

Figure 2:
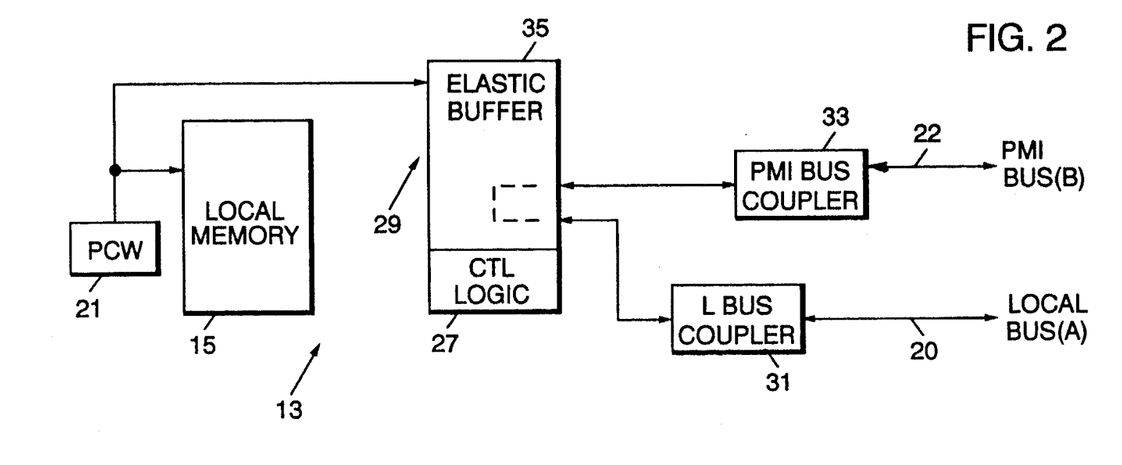
FIG. 2 is a schematic view of the structure of a communication pico-processor shown in FIG. 1 and incorporating the elastic buffer according to the invention.

FIG. 2 shows a more detailed view of the pico-processor (13) including the elastic buffer (29) according to the invention. The structure of the pico-processor (11) would be very similar, the local store (15) being replaced by the memory (9) of the packet memory (3). The application of the elastic buffer (29) in the pico-processors (11) or (13) shall be better understood through the brief description of the operation of the pico-processor (13). The function of the pico-processor (13) is to allow the exchange of information (data, control) between two asynchronous busses: the PMI bus (22) which ensures exchange of information between the packet memory (3) and a given LIM (7), and the local bus (20) of said LIM (7). Since the packet memory (3) is connected to a plurality of users and LIMs, the exchange rate on the PMI bus (22) is normally higher than the rate on local bus (20). According to a specific embodiment, the data exchange between the PMI bus (22) and the elastic buffer (29) uses bursts of four bytes of data, while the data exchange between the local bus (20) and the elastic buffer (29) uses single bytes of data. The communication between busses (22, 20) and the elastic buffer (29) involves adequate bus couplers (33, 31) of a known type, which are not further described since not concerned by the invention. The elastic buffer (29), in the shown embodiment, contains a 32 bytes move buffer (35) with separate move in and move out pointers, and associated control logic (described farther). Both the data move buffer (35) and the control registers (not shown) are accessible to a picocode, the instructions of which (PCW=picode words) are stored within a picocode register (21). The local memory (15) used for the real time interfacing with the user lines (24) (FIG. 1) and the elastic buffer (29) are addressed directly via the address field of the pico instruction register (21).

The heart of the elastic buffer according to the invention, is constituted of a move buffer (35) implemented by a RAM memory (37), as will be explained in greater detail in relation to FIGS. 3 and 4.

Figure 3:
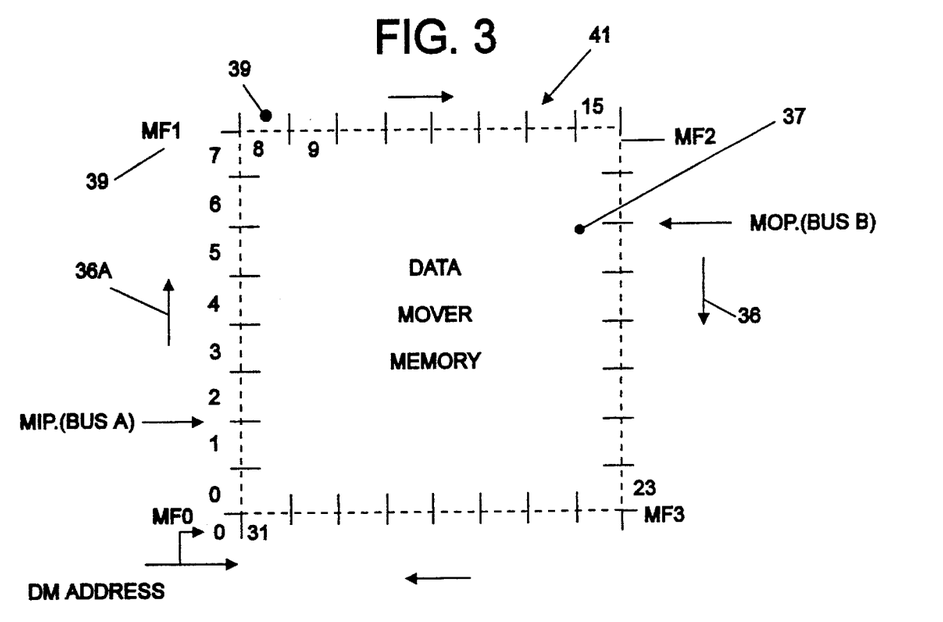
FIG. 3 is a schematic view of the elastic buffer and of its principle of operation.
Figure 4:
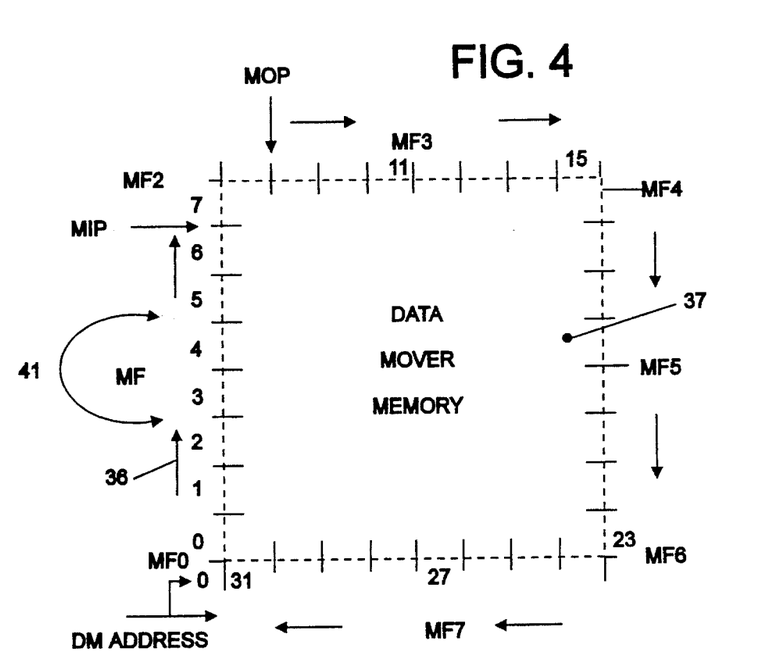
FIG. 4 is a schematic view of another organization of the buffer of FIG. 3.
Figure 5A:
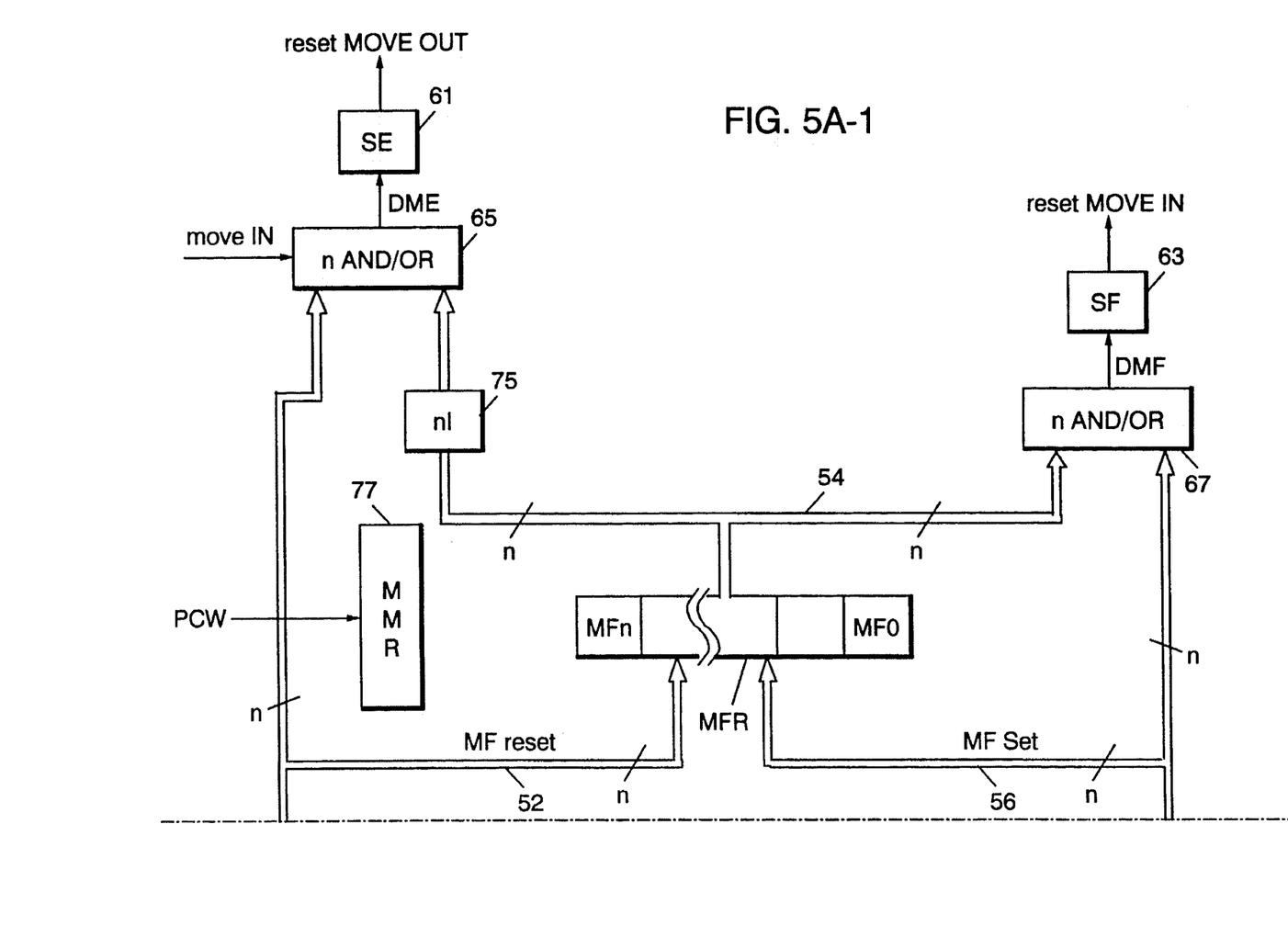
Figure 5A:
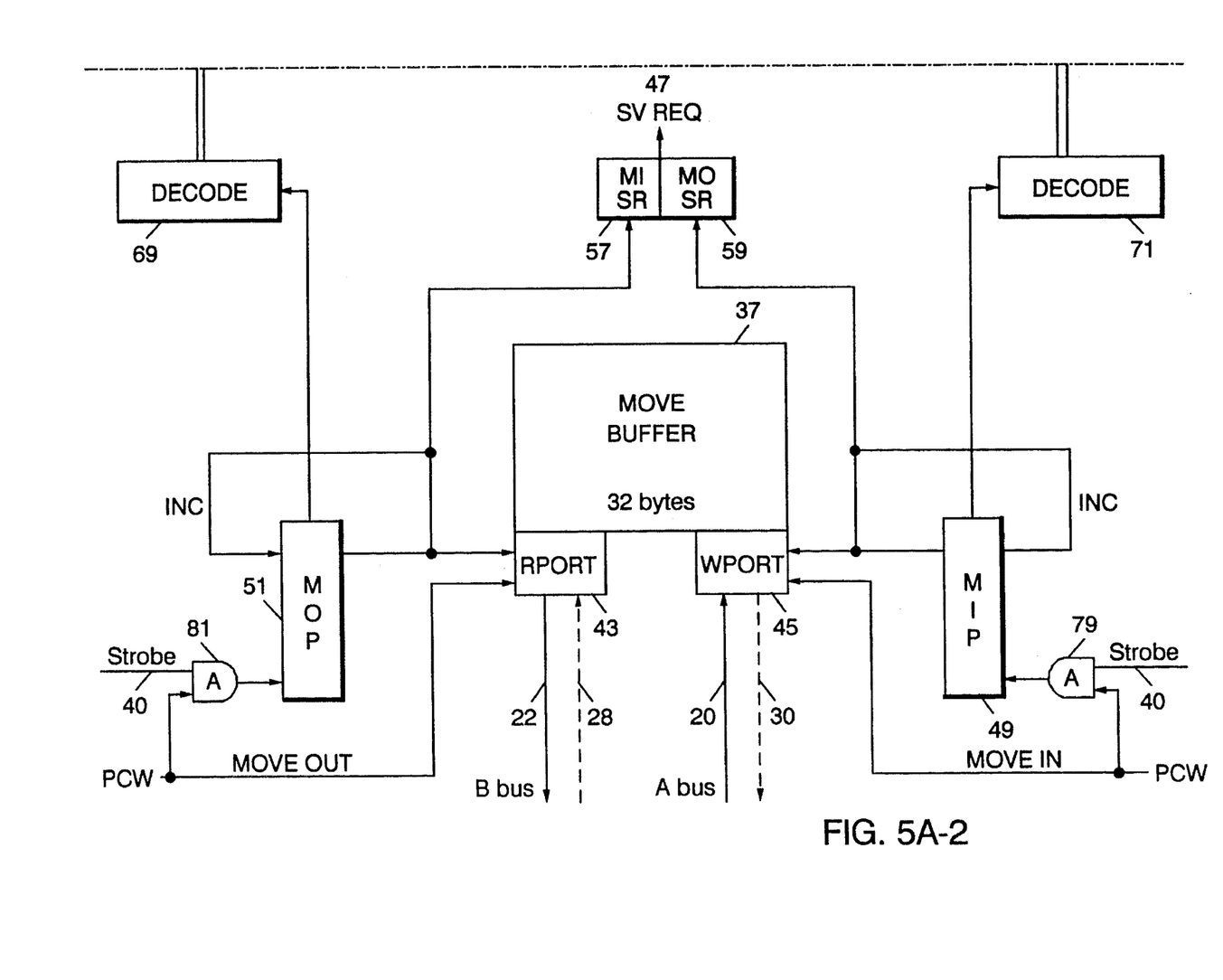

FIGS. 3 and 4 schematically show two different implementations or configurations of the heart of the elastic buffer according to the invention, i.e. the elastic buffer RAM memory (37). As a matter of example, the elastic buffer comprises a RAM memory (37) of 32 bytes of 8 bits (39). As will be later explained (FIG. 5A), the RAM is addressable by both a read and a write port, working independently.

In FIG. 3, the RAM (37) is subdivided into four sectors (41) of 8 bytes each, symbolically represented by the sides of the memory representation. Said sectors are adjacent, which means that the move in pointer (MIP) as well as the move out pointer (MOP), the instantaneous positions of which are shown, move across the successive sectors (41) as shown by arrows (36). Of course, the move in pointer (MIP) points to the RAM position that is next to be written into by one of the two asynchronous data busses A and B (for instance PMI bus (22) and local bus (20) of FIG. 2) connected to the data move buffer. And similarly, the move out pointer (MOP) points to-the RAM position that is next to be read onto the other of both previously mentioned busses (20, 22).

Figure 5B:
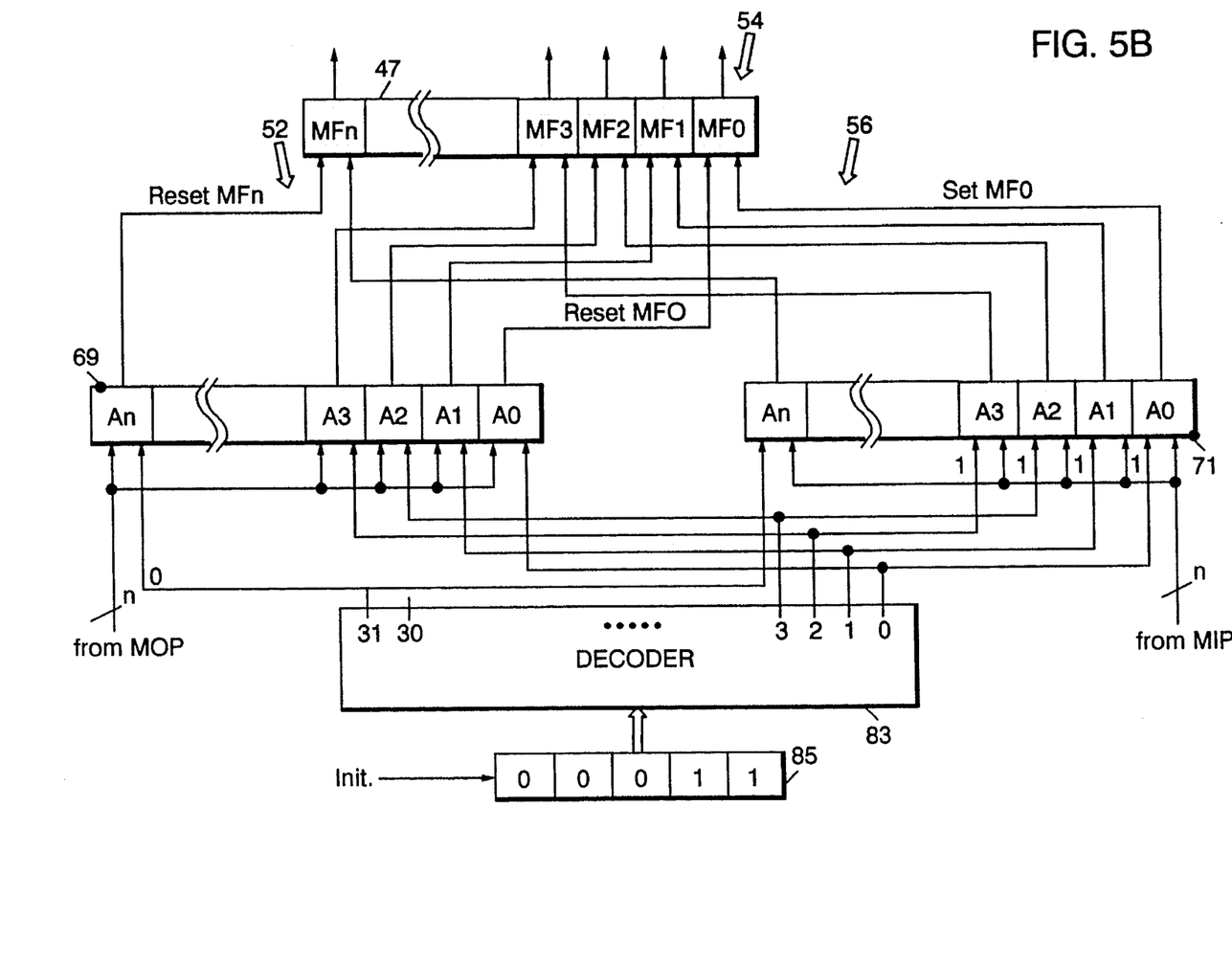
FIG. 5B is a more detailed view of the mark flag register and associated logic, shown in FIG. 5A, in the case of a reconfigurable elastic buffer.

According to one aspect of the invention, the data move buffer is an elastic buffer that is configurable, which means that, for a given size of the RAM (37), (32 bytes in our example), means are provided, as described in relation to FIG. 5B, for changing the partition of the RAM, and consequently, the number of sectors (41). Thus, while in FIG. 3 the RAM is partitioned into 4 sectors of 8 bytes each, the same RAM is, in FIG. 4, reconfigured and partitioned into 8 sectors of 4 bytes each, being understood that, according to the invention, any other regular partitioning can be used and tailored to the specific needs or data unit size of any specific application. The means for changing the granularity of the elastic buffer partitioning, and the advantages of doing so, will be explained in relation to FIG. 5B.

Further, according to the invention, each sector (41) is delimited by two mark flags. Thus, while in FIG. 3, the four sectors (41) are delimited by four mark flags MF0 to MF3, in FIG. 4, the eight sectors (41) are delimited by eight mark flags MF0 to MF7. Each of said delimiting flags has a settable binary value 0 or 1, and the function of said flags, which is essential for the operation of the elastic buffer according to the invention, will now be explained.

The Mark Flags associated to the data move buffer give an indication on the state Full or Empty of the data move buffer sector (41) they are controlling. A given mark flag controls the whole sector (41) located between it and the next mark flag. In FIG. 3, Mark Flag 0 controls the addresses from 0 to 7 (8 words), MF1 the addresses from 8 to 15, MF2 the addresses from 16 to 23 and MF3 the addresses from 24 to 31.

A Mark Flag at 0 means that the data bytes controlled by this flag can be written but cannot be read.

A Mark Flag at 1 means that the data bytes controlled by this flag can be read but cannot be written.

A Mark Flag controls the sector of the buffer that is located behind it in the direction of increasing buffer addresses.

The setting of the Mark Flags is controlled by the MIP which gives the address of the written location: when a data move buffer sector is just written, the Mark Flag controlling this part is set. For instance, if the MIP is incremented from 0 to N (with of course a write operation in the data move buffer for each value of the MIP), MF0 will be set to 1 when the MIP goes from 7 to 8, MF1 will be set to 1 when the MIP goes from 15 to 16, etc...

The resetting of these Flags is controlled by the MOP, which gives the read address. The mechanism is the same as above, but the flags are reset when the part controlled by said flag is read, allowing later a new write, into the emptied space.

The MIP is incremented only if the Mark Flag controlling the next addresses, relatively to the position of the MIP, is 0, which corresponds to the fact that the next sector is still empty, or already read and emptied after a previous write.

The MOP is incremented only if the Mark Flag controlling the next addresses relatively to the position of the MOP is set to 1, except if there is no move in progress. In this case, the MOP is incremented, in order to cause the reading of the bytes of the last sector, which had not been written completely.

The fact that the MOP is authorized to enter a new sector, by a mark flag set to 1, means that said new sector contains newly written data, which must be read to ensure consecutive writing and reading of information, without loss and without overrun.

The operation of the mark flags according to the rules formulated above, and the advantages linked thereto, will be better understood by way of an example of operation, described in relation to FIGS. 3 and 5A.

At the start, all mark flags (MF0 to MF3) are reset. The MIP is 0, and points to address 0 of the RAM (37).

As previously stated, a first bus (bus A) provides information to the data move buffer (37), and a second bus (bus B) asynchronously reads the data from said buffer, being understood that by way of example, busses A and B can be constituted by bus pairs (20, 22) or (22, 26) in the environment shown in FIG. 1.

As shown in FIG. 5A, means are provided, through a move mode register MMR (77) controlled by picocode, for selecting the direction of the data exchange, i.e. from bus A toward bus B (as in FIG. 5A, full lines (20, 22) or from bus B toward bus A (as in FIG. 5A), dotted lines (28, 30). This enables half-duplex bi-directional operation of the elastic buffer connected to bi-directional bus A on one side, and to bi-directional bus B on the other side.

The structure and operation of the elastic buffer according to the invention will be further described, under the assumption of a unidirectional data flow, from bus A toward bus B (FIGS. 3 and 5), without affecting the generality of the invention.

The MIP (49) is incremented at each received strobe (FIG. 5A) and gives the address of the data buffer byte to be written next. If four bytes are provided at a time on the bus A, they are written in parallel into the data move buffer RAM (37), bytes 0 to 3 (FIG. 3), and the MIP is set to 4. Thus, another write operation is needed to fill the bytes 4 to 7 of the first sector (41). When the MIP is set to 7, the Mark flag MF0 controlling the sector (41) which contains bytes 0 to 7 is set to 1, which means that the bytes corresponding to the addresses 0 to 7 have been written.

Similarly, when the MIP is set to 15, the mark flag MF1 is set to 1, which means that the bytes corresponding to the addresses 8 to 15 have been written, and so on.

The same process continues, as long as there is information provided by the asynchronous bus connected to the write port (45) of the RAM (37).

Of course, in order to avoid an overrun situation, wherein the RAM would be full although the incoming bus still has information to write, it is necessary that the outgoing asynchronous bus (B), i.e. the bus connected to the read port of the RAM, reads the consecutively stored data at a rate compatible with the rate of the incoming bus (A). Since the two busses are fundamentally asynchronous, this is just to say that the size of the data buffer RAM (37) must be chosen so as to permit an elastic operation of both busses connected to the elastic buffer, over a reasonable period of time. The adequate trade-off between the instantaneous rates of the incoming and outgoing busses and the amount of elasticity provided by the buffer size is a matter of design which lies within the experience of the man skilled in the art.

Figure 5C:
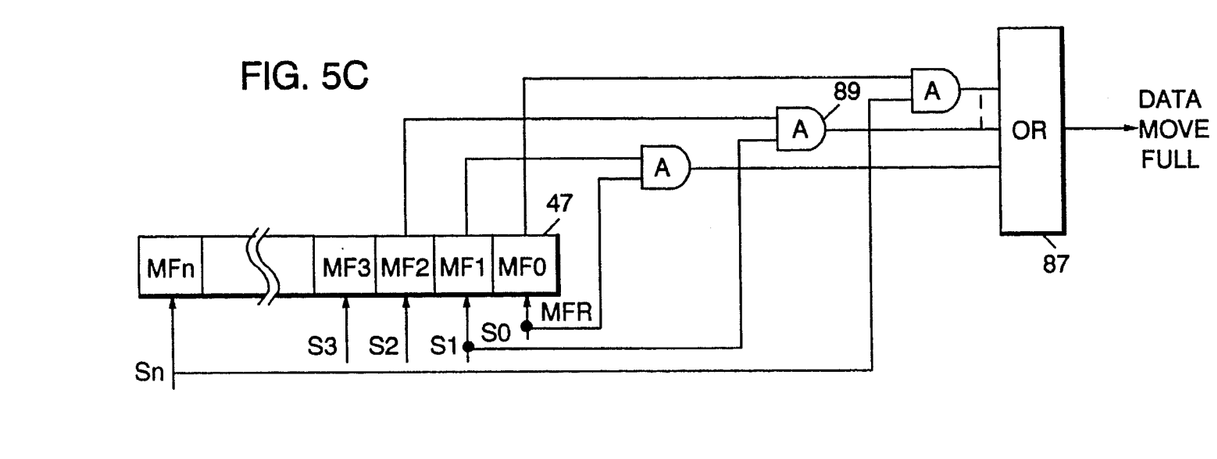
FIG. 5C is a view of the logic for generating a "data move buffer full" signal, using the mark flag register of FIG. 5B.

However, for a better data protection, means are provided, as explained farther in relation to FIG. 5C, to avoid that data written into the elastic buffer but not read yet, be lost by writing new data at the same addresses. Said means are able to detect, by using the state of two adjacent mark flags, a situation wherein a given sector (41) is full of fresh data, while the next successive sector is still full of data that have not been read again, which corresponds to a "data move buffer full" situation, handled as explained in relation to FIG. 7.

The function and operation of the additional logic shown in FIGS. 5A, 5B, 5C and 5D shall be better understood in relation to the move in and move out operations, described below.

Figure 6:
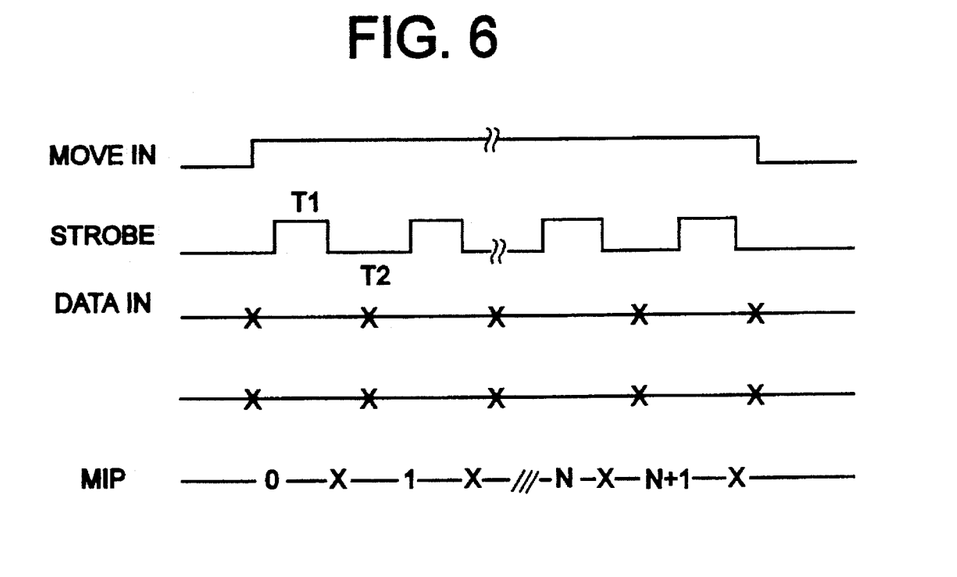
FIGS. 6 and 7 are timing diagrams relevant to the operation of moving data into the elastic buffer.

Move in operation:

The timing of this operation is shown in FIG. 6. Data bytes are provided on bus A (FIG. 5A) corresponding to "data in" signal (FIG. 6). A move in signal provided by a picocode routine located in the emitting device (not shown) enables writing of the data from the A-bus into the write-port WPORT (45) of the data move buffer (37). This is done according to the clock rate provided by the strobe line (40).

The strobe and Move-in signals are ANDed by AND gate (79). Thus, if Move-in signal is high, each strobe period will cause an incrementation of the Move-in pointer MIP (49), which positions the WPORT (45) onto the next byte position of the data move buffer (37). Thus, the writing of the successive incoming data bytes into the data move buffer (37) causes the filling of its adjacent sectors (FIG. 3), and the setting of the mark flags controlling them.

Figure 5D:
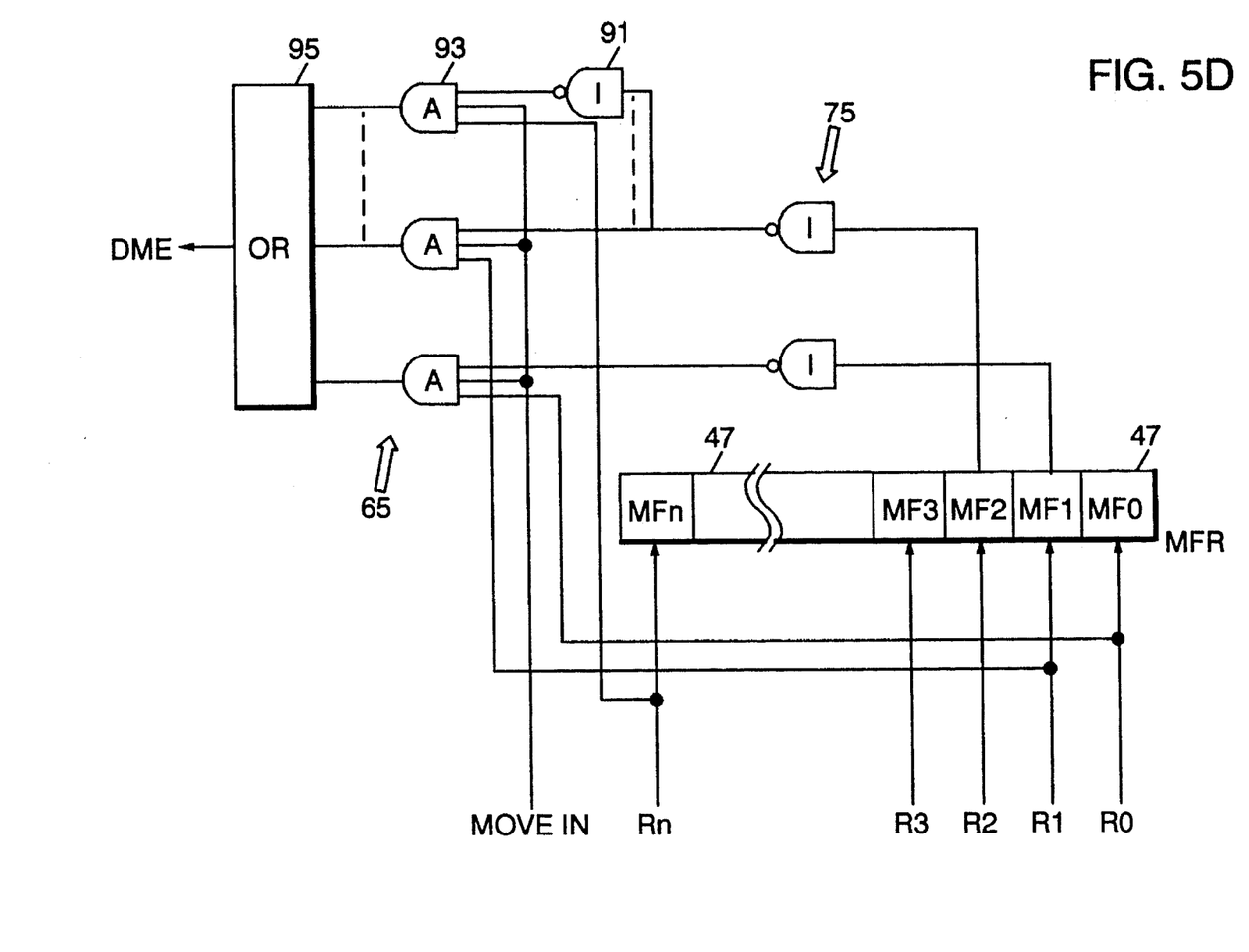
FIG. 5D is a view of the logic for generating a "data move buffer empty" signal, using the mark flag register of FIG. 5B.

At the start, all the mark flags, located in a mark flag register MFR (47) are reset (by picocode) and the MIP (49) contents is 0. The MIP (49) is incremented at each received strobe and gives the next data move buffer address to be written. It is to be noted that the decoding circuits (69, 71) as well as the mark flag register MFR (47) and circuits (65, 67, 75) have been represented in FIG. 5A in a general manner, corresponding to a variable number of mark flags (MF0 to MFn), where n is the maximum number of mark flags that can be implemented, according to the size of the RAM (37). If the RAM size is 32 bytes, and if the unit of data is one byte, the maximum granularity of the RAM partitioning would be obtained with 32 sectors, delimited by 32 mark flags. The general implementation of the circuits (69, 71, 67, 75 and 65) in the case of a configurable elastic buffer is shown in FIGS. 5B, 5C and 5D.

More specifically, if it is assumed that a buffer partitioning involving four sectors (41) as shown in FIG. 3, the decoding circuit (71) will decode the value of the MIP (49) and provide decodes of the values 7, 15, 23 and 31, as the MIP (49) reaches those values. These decodes are provided in parallel on bus (56), to the mark flag register MFR (47), and the corresponding cells of said register are set. For instance, when MIP=7, the mark flag 0 is set to 1 within MFR (47), meaning that addresses 0 to 7 of the data move register (37) have been written.

Of course, in order not to loose information, no information must be written into a sector (41) of the data move buffer (37) having already been written, but not read yet by bus B, corresponding to a "data move buffer full" situation. Therefore, means are provided for monitoring the instantaneous status of the data move buffer, using the mark flags controlling the sectors (41) of said buffer, and stopping the move in operation if a data move buffer full condition is detected. Thus, a "data move buffer full" (DMF) and a "reset move in signals are generated, as shown in FIGS. 5A and 5C.

The status of each mark flag MF0 to MF3 (in case there are only four sectors in the buffer) is read from the MFR (47) and provided by bus (54) to four AND gates (67), where each mark flag status is AND/ORed with the corresponding decode line provided by decoding circuit (71) and causing the setting of the respective mark flags. Thus, for each mark flag, the receipt of a "set mark flag" signal while the considered mark flag is already set, is detected, meaning that the data move buffer (37) is full. Thus, the output of circuit (67) is a "Data move buffer full" DMF signal, and it sets a "status full" SF status bit into a status register (63).

Figure 7:
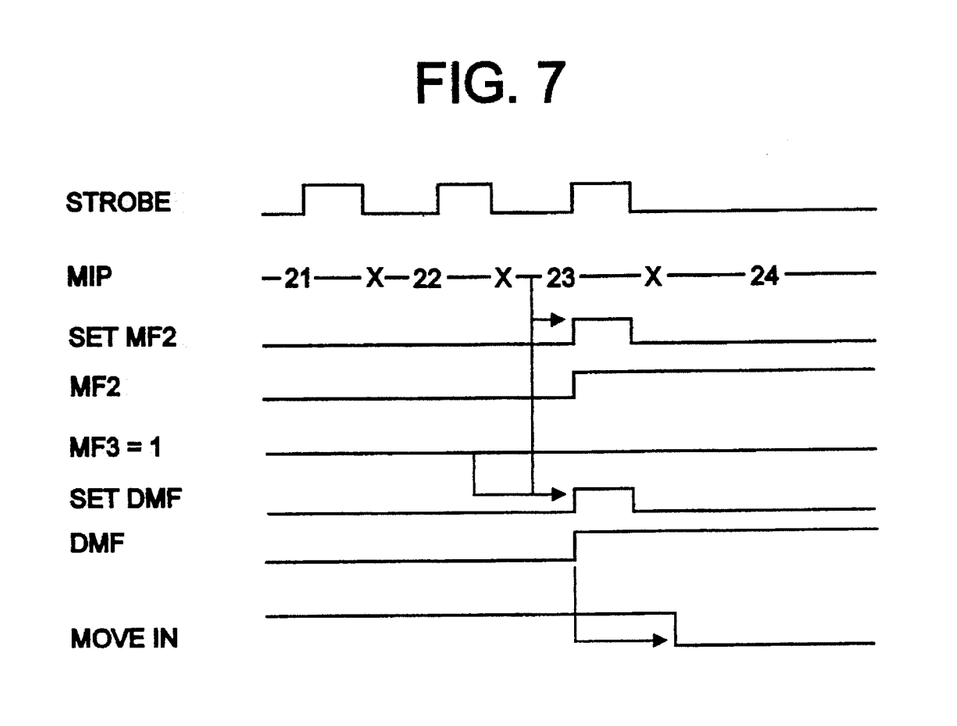

The timing of the above operations is shown in FIG. 7. In the shown example, when the current value 23 is decoded from the MIP (49), the "set MF2" signal provided by decoder (71) causes the setting of Mark flag 2 within MFR (47). Since the next mark flag MF3 is still detected to be set, the data move buffer (37) is full, a "set DMF" signal is generated, and consequently, the "MOVE IN" signal enabling writing of data into the buffer (37) is reset.

Of course, the DMF signal is reset after a move out operation, as soon as the mark flag (MF2 here) has been reset, meaning that the move out operation has emptied the sector (41) controlled by MF2.

Then, the move in operation will restart under the picocode control. The picode is alerted of the possibility to request a new move-in operation, by a Move In Service Request (MISR) bit set into register (57) after each move-out. And the move in operations will continue until a next mark flag in a set position, is reached by the move in printer MIP (49).

Figure 8:
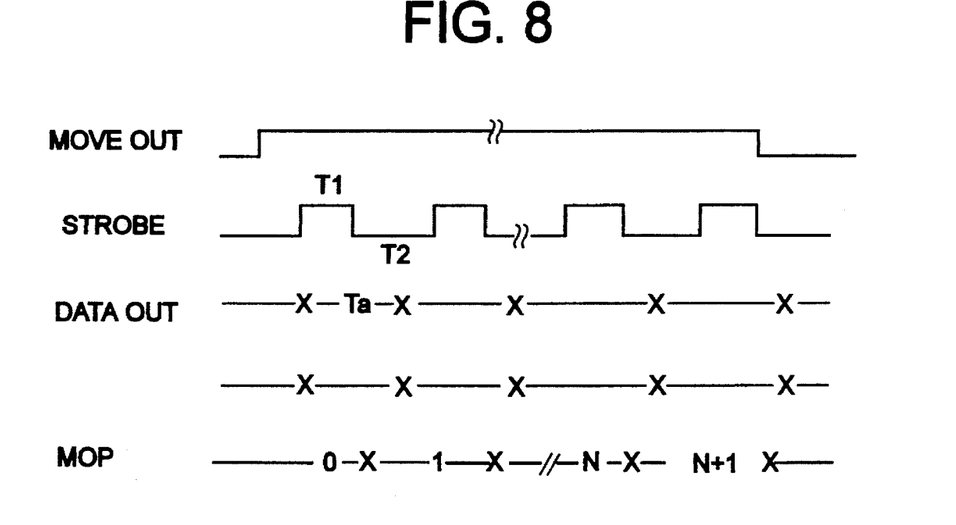
FIGS. 8 and 9 are timing diagrams relevant to the operation of moving data out of the elastic buffer.

Move out operation:

The timing of this operation is shown in FIG. 8. Data bytes are provided on bus B (FIG. 5A) corresponding to "data out" signal (FIG. 8). A move out signal provided by a picocode routine located in the receiving device (not shown) enables reading of the data from the RPORT (43) of the data move buffer (37) onto the B-bus. This is done according to the clock rate provided by the strobe line (40).

The strobe and Move-out signals are ANDed by AND gate (81). Thus, if Move-out signal is high, each strobe period will cause an incrementation of the Move-out pointer MOP (51), which positions the RPORT (43) onto the next byte position of the data move buffer (37). Thus, the reading of the successive outgoing data bytes from the data move buffer (37) causes the emptying of its sectors (41) (figures 3), and the resetting of the mark flags controlling them.

At the start, at least one mark flag, located in the mark flag register MFR (47) is set (by picocode) and the MOP contents is 0. The MOP (51) is incremented at each received strobe and gives the next data move buffer address to be read. If the partitioning of buffer (37) is the one shown in FIG. 3, the value of the MOP (51) is decoded by a decoder (69) providing decodes of the values 7, 15, 23 and 31, as the MOP reaches those values. These decodes are provided on parallel bus (52), to the mark flag register MFR (47), and the corresponding cells of said register are reset. For instance, when MOP=7, the mark flag 0 is reset to 0 within MFR (47), meaning that addresses 0 to 7 of the data move register (37) have been read.

Of course, in order not to introduce false information, no information must be read from a sector (41) of the data move buffer (37) having already been read, corresponding to a "data move buffer empty" situation. Therefore, means are provided for monitoring the instantaneous status of the data move buffer, using the mark flags controlling the sectors (41) of said buffer, and stopping the move out operation if a data move buffer empty condition is detected. Thus, a "data move buffer empty" and a "reset move out" signals are generated, as shown in FIGS. 5A and 5D.

The status of each mark flag MF0 to MF3 (in case there are only four sectors in the buffer) is read from the MFR (47) and provided by bus (54) to 4 inverting circuits nI (75) and to AND/OR circuit (65), where each mark flag status is AND/ORed with the corresponding decode line provided by decoding circuit (69) and causing the resetting of the respective mark flags. Thus, for each mark flag, the receipt of a "reset mark flag" signal while the considered mark flag is already reset, is detected. This means that the data move buffer (37) is empty, provided that the last written sector be not partially full, in which case the mark flag corresponding to said sector would still be set to 0, and falsely indicate that the sector is empty. To get rid of this uncertainty, the AND/OR circuit (65) is also provided with the "move in" entry. Thus, the DME condition is checked only while the move in signal is on, which permits to avoid giving a DME indication while there is a partially full sector in the data move buffer (37). The output of circuit (65) is a "Data move buffer empty" DME signal, and it sets a "status empty" SE status bit into a status register (61).

Figure 9:
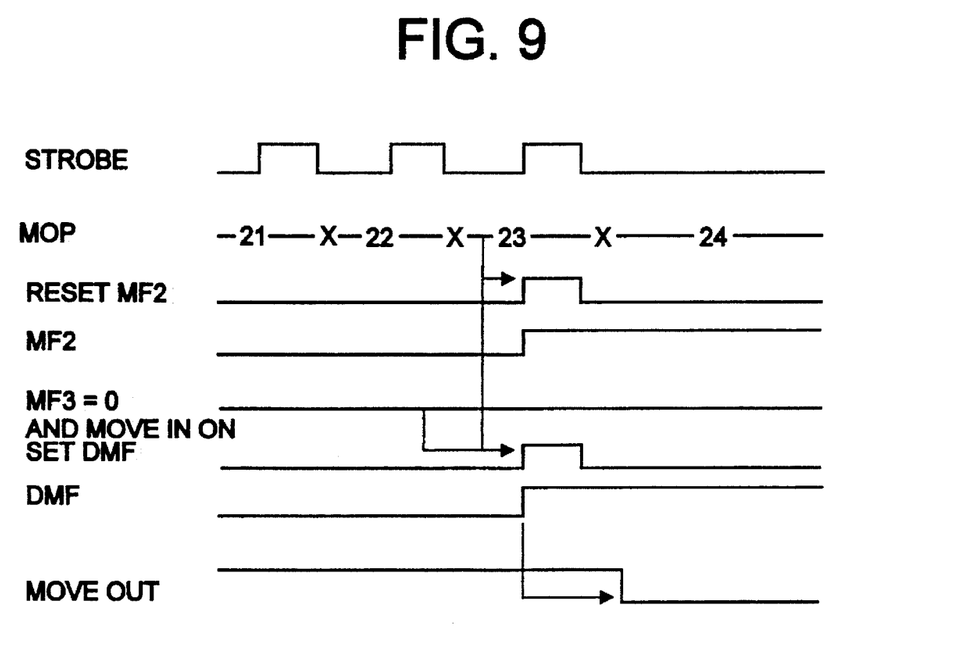

The timing of the above operations is shown in FIG. 9. In the shown example, when the current value 23 is decoded from the MOP (51), the "reset MF2" signal provided by decoder (69) causes the resetting of Mark flag 2. Since the next mark flag MF3 is still detected to be reset while the Move In signal is ON, the data move buffer (37) is empty. Thus, a "set DME" signal is generated, and consequently, the "MOVE OUT" signal enabling reading of data from the buffer (37) is reset.

Of course, the DME signal is reset after a move in operation, as soon as the mark flag (MF2 here) has been set, meaning that the move in operation has filled the sector (41) controlled by MF2.

Then, the move out operation will restart under the picocode control, alerted by a Move Out Service Request bit (MOSR) set into register (59) after each move in. And the move-out operations will continue until a next mark flag in a reset position, is reached by the move out pointer MOP (51).

FIGS. 5C and 5D show in greater detail how the DMF and DME signals can be generated.

In FIG. 5C, the mark flag setting signal (Si) of the various mark flags are derived in parallel from bus (56) (FIG. 5A). The status of a given mark flag MFi, (i=0 to n), as taken from MFR (47) is ANDed by AND gates (89) with the mark flag setting signal Si-1 corresponding to the preceding mark flag.

Thus, the condition of a sector getting full, while the next sector of the data move buffer is still full, is detected. Since any such condition means that the data move buffer is full, all the outputs of AND gates (89) are ORed in OR gate (87), the output of which reflects the condition of the data move buffer being full.

Similarly, in FIG. 5D, the mark flag resetting signal (Ri) of the various mark flags are derived in parallel from bus (52) (FIG. 5A).

The status of a given mark flag MFi (i=0 to n), as taken from MFR (47), is inverted in inverters (75), and ANDed, on the one hand with the move in signal for reasons explained above, and on the other hand with the mark flag resetting signal Ri-1 corresponding to the preceding mark flag. Thus, the condition of a sector getting empty, while the next sector is still empty, is detected. And ORing all the conditions in OR gate (95) produces a DME signal that reflects the condition of the data move buffer being empty.

It is essential to be understood that, during normal data transmission from bus A to bus B, the above described move-in and move-out operations are normally simultaneous. If the buffer is empty, the first operation must be a move-in, and a move-out is always initiated by the picocode, because it must follow a-move-in. In normal operation, the sectors (41) of the buffer are read some variable time after they have been written. In FIG. 3, the elasticity of the data move buffer according to the invention can be illustrated by the fact that, by the time the MIP reaches MF1 and causes the setting of MF0, the MOP can already be positioned on byte 31, waiting for MF0 to get raised and letting it enter the corresponding sector, or the MOP can still be positioned on byte 8 for the purpose of reading it. In this extreme situation, the MOP is late by three whole sectors of buffer (37), corresponding to the maximum amount of elasticity between asynchronous data transmitted from bus A toward bus B. Of course, any intermediate relative positioning of MIP/MOP is possible, as the one shown in FIG. 3.

It is also to be noted that, if the move in line is dropped, the mark flags are ignored, and the MOP will continue to be incremented until MIP=MOP and an End of Data indicator is raised by the originating device, connected to bus A. This allows to clear the data move buffer at the end of a move out operation, thus ensuring that all the data sent by bus A is received by bus B, and that no padding information is transmitted when move-in and move-out operations are resumed.

The above description of the structure and of the operation of the elastic buffer according to the invention allow a better understanding of its advantages: while data are fully independently but simultaneously received from a first bus and transmitted to a second bus asynchronous with the first one, the elasticity provided can produce a shift between input and output, that is only limited by the size of the buffer.

Moreover, although not described in detail, the elastic buffer according to the invention can be easily adapted thanks to minor changes to the move-out byte counting and dispatching logic, to the case where a high rate bus (A) conveys time-multiplexed information toward a plurality of lower rate buses (B, B', B". . . ).

FIG. 5B shows in greater detail how the mark flags located in the mark flag register MFR (47) can be set and reset, when the data move buffer (37) is configurable, i.e. can be partitioned in different ways. The interest of being able to tailor the number and size of sectors (41) of the data move buffer lies in that it allows to adapt the data move buffer according to the invention, to a variety of data flows, and to optimize the elastic buffer throughput, for every data rate. It is assumed that the buffer has a constant size. If it were partitioned into only two sectors of half the total size, the delay between the input and the output of a given byte of information would be at least the time corresponding to the writing or reading of a whole sector, since no sector can be simultaneously written and read.

Thus, increasing the number of sectors (41) and decreasing their individual size, allows to reduce the delay between writing and reading of data. Of course, the optimum partitioning depends on the particular data flow between busses A and B, and on the number of bytes per transmission burst.

According to the invention, means (85, 83, 69, 71) are provided in order to modify the granularity of the elastic buffer partitioning.

As shown in FIG. 5B, a specific partitioning is obtained according to the setting of a binary word into an initialization register (85). The initialization word is decoded by a decoder (83), which delivers, for a bit of the initialization word at "one", a number of "ones" corresponding to two powered to the rank of said bit within the binary initialization word.

The "ones" output by the decoder (83) are used to validate one entry of a series of AND gates. Each series of AND gates receives on the other entries respectively the decoded byte counts of 7, 15, 23, 31 . . . from the MIP (49) and MOP (51) (FIG. 5), and thus provide for the timely setting (respectively resetting) of the mark flags MF0 to MFn in MFR (47).

Accordingly, if, as in FIG. 5B, the bit of rank 2 in the initialization word is "1", the decoder 83 generates four outputs at "1", and decoding circuits (69, 71) provide for the setting/resetting of four mark flags. Accordingly, the data move buffer is partitioned into four sectors (41), as in FIG. 3.

We claim:

1. An elastic buffer (29) for buffering data between a first data bus (A) and a second data bus (B) said first data bus and said second data bus being asynchronous, said elastic buffer comprising:

a RAM (37) partitioned into a plurality of sectors (41);

a read port operatively connected to the RAM;

a write port operatively connected to the RAM;

a move in pointer "MIP" means coupled to the write port and generating a first set of control signals which causes said write port to write data received from the first bus into sequential addresses of each one of the plurality of sectors;

wherein each of said sectors (41) is written, according to the displacement of the move in pointer MIP (49) across a current sector being in write mode, the event of said pointer reaching the next consecutive sector (41) causing the setting of said current sector into read mode;

a mark indicator means, responsive to signals from the MIP, to be set in a first state when each one of the plurality of sectors is full with data; and a move out pointer "MOP" means, coupled to the read port, for generating a second set of control signals, some of which cause the read port to read data from consecutive addresses in selected ones of the plurality of sectors and others of said second set of control signals setting the mark indicator means to a second state when each one of the sectors is empty.

2. An elastic buffer (29) for buffering data between a first data bus (A) and a second data bus (B) said first data bus and said second data bus being asynchronous, said elastic buffer comprising:

a RAM (37) partitioned into a plurality of sectors;

a read port operatively connected to the RAM;

a write port operatively connected to the RAM;

a move in pointer "MIP" means coupled to the write port and generating a first set of control signals which causes said write port to write data received from the first bus into sequential addresses of each one of the plurality of independently operable sectors;

a mark indicator means., responsive to signals from the MIP, to be set in a first state when each one of the plurality of independently operable sectors is full with data; and a move out pointer "MOP" means, coupled to the read port, for generating a second set of control signals, some of which cause the read port to read data from consecutive addresses in selected ones of the plurality of sectors and others of said second set of control signals setting the mark indicator means to a second state when each one of the sectors is empty wherein each of said sectors (41) is read according to the displacement of the move-out pointer MOP (51) across a current sector being in read mode, the event of said pointer reaching the next consecutive sector (41) causing the setting of said current sector into write mode.

3. An elastic buffer (29) for buffering data between a first data bus (A) and a second data bus (B) said first data bus and said second data bus being asynchronous, said elastic buffer comprising:

a RAM (37) partitioned into a plurality of sectors (41) wherein each of said sectors (41) is delimited by a marking flag, the current value of which determines if a given sector (41) is in write mode or in read mode;

a read port operatively connected to the RAM;

a write port operatively connected to the RAM;

a move in pointer "MIP" means coupled to the write port and generating a first set of control signals which causes said write port to write data received from the first bus into sequential addresses of each one of the plurality of sectors and setting the marking flag to a first value when each one of the plurality of sectors is full with data; and a move out pointer "MOP" means, coupled to the read port for generating a second set of control signals, some of which cause the read port to read data from consecutive addresses in selected ones of the plurality of sectors and others of said second set of control signals setting the marking flag to a second value when each one of the sectors is emptied.

4. An elastic buffer according to claim 3, wherein the displacement of the move in pointer MIP(49) to the first position of a given sector (41) causes the setting of the mark flag controlling the previous sector, to a value corresponding to the read mode, thus enabling said sector to be read upon arrival of the move out pointer MOP (51) to said sector.

5. An elastic buffer according to claim 3, wherein the displacement of the move-out pointer MOP (51) to the first position of a given sector (41) causes the setting of the mark flag controlling the previous sector, to a value corresponding to the write mode, thus enabling said sector to be written upon arrival of the move in pointer MIP (49) to said sector.

6. An elastic buffer according to claim 3, characterized in that it includes means (71, 67) using the instantaneous values of said marking flags, for detecting the event of the data move buffer (29) being full, and means (69, 65, 75) using the instantaneous values of said marking flags, for detecting the event of the data move buffer (29) being empty.

7. An elastic buffer (29) for buffering data between a first data bus (A) and a second data bus (B) said first data bus and said second data bus being asynchronous, said elastic buffer comprising:

a RAM;

means (85, 83) for selecting any possible regular partitioning of the RAM (29) into a plurality of sectors (41) of identical size, said size being adapted to the characteristics of the data flow between the first bus (A) and the second bus (B);

a read port operatively connected to the RAM;

a move in pointer "MIP" means coupled to a write port and generating a first set of control signals which causes said write port to write data received from the first bus into sequential addresses of each one of the plurality of sectors;

a mark indicator means, responsive to signals from the MIP, to be set in a first state when each one of the plurality of sectors is full with data; and a move out pointer "MOP" means, coupled to the read port, for generating a second set of control signals, some of which cause the read port to read data from consecutive addresses in selected ones of the plurality of sectors and others of said second set of control signals setting the mark indicator means to a second state when each one of the sectors is empty.

8. An elastic buffer for controlling the transmission of data between a plurality of data buses operating asynchronously comprising:

a RAM partitioned into a plurality of sectors, each of said sectors containing successive memory addresses into which data is written or from which data is read;

at least one mark flag being associated with each sector, said mark flag being operable to be set in a first state indicating the sector can be written into or a second state indicating the sector cannot be written into;

a first means including a Move In Pointer (MIP) for generating a first set of control signals indicating sequential addresses in a sector in which data is to be written and to set the mark flag into the second state when the sector is full; and a second means including a Move Out Pointer (MOP) for generating a second set of control signals indicating sequential addresses in a sector from which data is to be read and to set the mark flag into the first state when the sector is read.

9. The elastic buffer of claim 8 further including a write port operatively connected to the RAM said write port responsive to selected ones of the first set of control signals to transfer data received from a first one of the plurality of data buses into sequential addresses of a sector.

10. The elastic buffer of claim 9 further including a read port operatively connected to the RAM said read port responsive to selected ones of the second set of control signals to transfer data from sequential addresses in a selected sector onto a selected one of the plurality of buses.

11. An elastic buffer for controlling the transmission of data between a plurality of data buses operating asynchronously comprising:

a RAM partitioned into a plurality of sectors, each of said sectors containing successive memory addresses into which data is written or from which data is read;

at least one mark flag being associated with each sector, said mark flag being operable to be set in a first state indicating the sector can be written into or a second state indicating the sector cannot be written into; and means operatively coupled to dynamically set selected mark flags into the first state and dynamically set other mark flags into a second state so that each state indicating sectors in which data can be written into (write mode) and sectors from which data can be read (read mode), with the writing of data and the reading of data occurring simultaneously;

a Move In Pointer (MIP) to identify sequential addresses whereat data is to be written in a sector marked for writing; and a Move Out Pointer (MOP) to identify sequential addresses whereat data is to be read from a sector marked for reading.

* * * * *